April 27, 1937.   J. P. FREDERICKSEN   2,078,320
CUTTING MACHINE
Filed Sept. 28, 1934
Fig. 1.
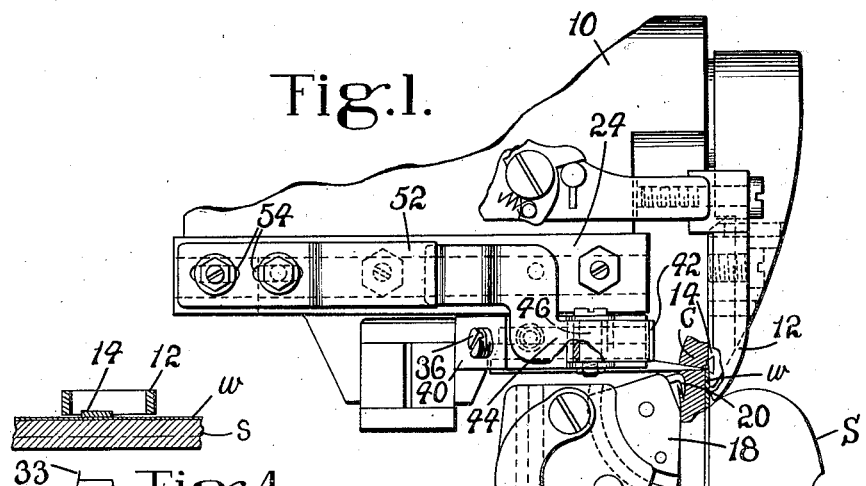
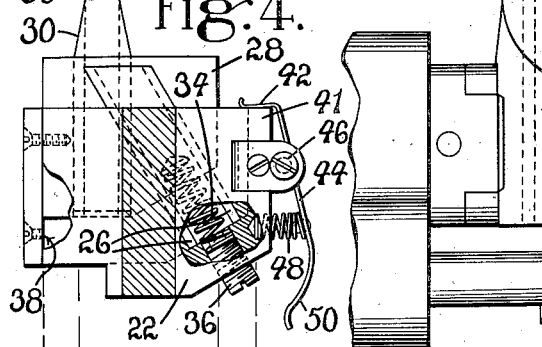
Fig. 4.
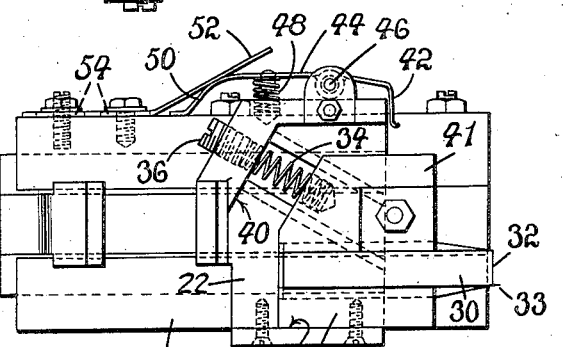
Fig. 2.
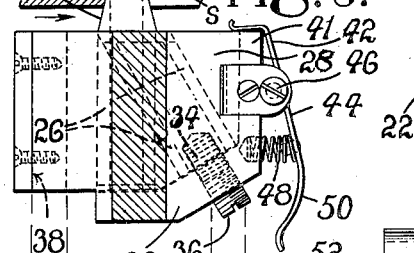
Fig. 5.
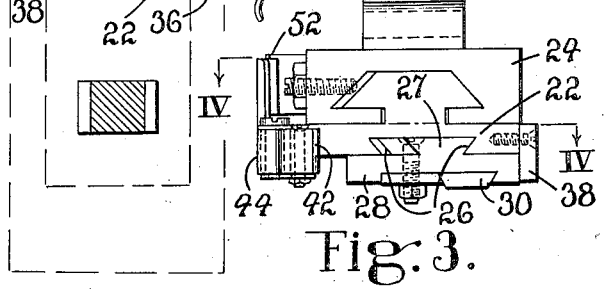
Fig. 3.
INVENTOR
James P. Fredericksen
By his attorney
Victor Cobb

UNITED STATES PATENT OFFICE 2,078,320

CUTTING MACHINE

James P. Fredericksen, Quincy, Mass., assignor to United Shoe Machinery Corporation, Paterson, N. J., a corporation of New Jersey Application September 28, 1934, Serial No. 745,971

24 Claims. (Cl. 12—18)

My invention relates to machines for cutting various materials, it being herein disclosed as embodied in an apparatus of the character of that made the subject of Letters Patent of the United States No. 1,030,606, Perry, June 25, 1912, for making rounding and channeling cuts in soles which are in place upon the bottoms of welt-shoes.

An object of the invention is to so grip a sole or other work-piece that it may be advanced positively for successive cutting operations. In the patented machine just mentioned, the feed is imparted to the work by a support which carries the channel-knife and engages the tread-surface of the sole being operated upon, and by a plate contacting with the welt of the shoe and which also serves as an abutment against which the rounding knife cuts. Because the channel-knife-support must be clear of the path of the rounding knife, the opposite work-engaging members by which feed is effected are out of horizontal alinement, so the applied forces produce a couple tending to turn or bend the work rather than to hold it securely. The present invention avoids this by causing a knife or other cutting means to act as feeding means, it being made effective upon contact with the work. This may be caused by moving the cutting means in the direction of advance of the work at the same time it makes its cut. The means for producing this compound movement of the knife herein shown utilizes a reciprocatory carrier for a knife-holder, said holder being movable upon the carrier, as in ways, in a direction inclined at other than a right angle to the path of said carrier and to that of the work and longitudinally of said path. The holder is preferably yieldable upon the carrier, and, as its knife meets the resistance of the work, the carrier traveling at an angle to the path in which the holder is, by its ways, constrained to move, shifts said carrier and the knife laterally to urge the work in the desired direction. The knife may be directly opposed by a plate or abutment to which is imparted a feeding movement corresponding to that of said knife, the two elements giving the desired positive grip upon the work. Further, when a channel-knife and its support are present, said support may act with the rounding knife and feed-plate to engage and advance the work, increasing the certainty of the feeding action. Were the knife to be withdrawn from the work in the same manner in which it entered, with a lateral force exerted but reversed in direction, it might carry back the work, reducing the extent of feed. I avoid reverse movement of the work during the retraction of the knife by preventing movement of the knife during it withdrawal from the work oppositely to that by which the feed is produced. Preferably, a retaining member or latch is provided, which temporarily restrains the knife-holder from movement toward the work during retraction and then releases it for the succeeding cut.

In the accompanying drawing, my invention is illustrated in one form which it may assume.

In Fig. 1, the elements appear in broken side elevation;

Fig. 2 is a bottom plan view of the rounding knife and the more closely associated parts, the knife being in its normal position;

Fig. 3 shows the same parts in end elevation looking from the right in Fig. 2; and Figs. 4 and 5 are horizontal sections upon the line IV—IV of Fig. 3, the rounding knife being respectively in its normal and retracted positions in the carrier-slide.

I have shown, of the patented machine above mentioned, a frame 10 carrying a crease-guide 12, an oscillatory feed-plate 14 and an oscillatory support 16 for a holder 18 of a channel-knife 20, both the feed-plate and the channel-knife-support being movable toward and from each other to grip the work and feed it by their oscillation in successive steps. Further, there is a reciprocatory carrier-slide 22 for a rounding knife, this slide being movable upon a guide-plate 24. As will later appear, these elements differ from previous apparatus chiefly with respect to their timing during an operating cycle.

Considering now the features peculiar to the present invention, formed in the under side of the slide 22 are dovetail ways 26, in which is movable the complemental portion 27 of a holder 28 for a rounding knife 30 for which the feed-plate 14 furnishes an abutment. Although the cutting edge 32 of the knife extends at right angles to the path of the slide 22, the ways 26 are inclined. As best shown in Figs 4 and 5, the angle of inclination is less than 90° as the ways and the slid-path converge outwardly. This inclination is from right to left as the operator faces the machine, or left to right, in the direction indicated by the arrow, as viewed in Fig. 5. Located in a bore in the holder 28 is a spring 34 contacting at its outer extremity with a screw 36 threaded into the slide 22. This urges the holder and its knife normally forward. By turning the screw in or out, the compression of the spring may be altered to vary the resistance offered to rearward yield of the holder and knife.

The forward travel of the holder under the influence of the spring is limited by contact of said holder with the slide 22 at 38. At its opposite extreme of movement, the holder may engage a rib 40 depending from the under side of the slide, so the final action of the rounding knife is positive. When the holder 28 and its knife are fully retracted in the slide, a corner 41 of the holder passes behind the angular outer end 42 of a latch 44, pivoted at 46 upon the slide and urged into holder-retaining relation by a spring 48. When the slide is at its rearward extreme of movement, after the knife has been withdrawn from the work, the curved inner end 50 of the latch strikes a contact member 52 secured to the plate 24 and is thereby swung upon its pivot to release the holder. The contact member is preferably secured to the plate by slot-and-screw connections 54, so adjustment of the member may cause the time at which the holder is unlatched to be varied.

Considering the operation of the machine, an interval in its cycle may be taken when the previously described operating elements are at rest. This is as appears in Fig. 4. Assuming their location and direction of movement to be viewed from the operator's station, the channel-knife-support 16 is at its extreme position to the right, and the feed-plate 14 is on the point of completing its travel to the right into registration with it. The support and plate are separated from each other to the maximum extent, giving a space to receive the work. The rounding-knife-slide 22 is withdrawn rearwardly, and as the latch 44 has been released by engagement with the member 52, the holder 28 is forced forward by a spring 34. A shoe S is located by the operator by engagement of its crease with the guide 12, the welt $w$ and the bottom of the sole $s$ being presented to the feed-plate and channel-knife-support respectively. As the elements start their operating movements, the feed-plate 14 is carried to the extreme right into alinement, transversely of the direction of feed, with the rounding knife 30, which now begins to advance toward it as a result of forward movement of the slide 22. At this time, the feed-plate and channel-knife-support are carried toward each other to grip the work between them. The cutting edge 32 of the rounding knife has reached the bottom surface of the sole and has begun its cut. When the resistance offered by the sole, held against outward movement by the feed-plate, to the entrance of the rounding knife exceeds the force necessary to compress the spring 34, said spring yields, this occurring at about the time the feed-plate and channel-knife-support have fully engaged the work. The action of the inclined ways 26 of the slide upon the knife-holder-portion 27 causes the knife and holder to shift from right to left as the knife-edge continues to penetrate the sole and the holder to yield. Simultaneously, the feed-plate and channel-knife-support move toward the left. As a result of this, the work is advanced under the feeding effect produced by the travel of the channel-knife-support and the rounding knife at one side and the feed-plate at the other. As the last two elements are in horizontal alinement, with the knife embedded in the sole and the welt-engaging surface of the plate roughened, as is customary, the hold upon the work renders slipping impossible, so the extent of feed for each operating cycle is made certain. If desired, there may be formed at one end of the knife-edge 32 a small angular portion or lip 33, which gives added resistance to displacement of the work longitudinally of said edge. As the rounding knife is completing its cut to sever the chip $c$ from the sole $s$ and is being secured in its retracted relation upon the slide 22 by the latch 44, the movement of the feed-plate and the channel-knife-support toward the left ceases, and the travel of the last-mentioned element is reversed while the feed-plate rests. This causes the channel-knife 20 to form in the sole a section of the channel equal in length to the extent of the feed just described. The rounding knife is still in the sole and, with the feed-plate, holds it firmly for the channeling operation. Now the slide 22 is withdrawn, carrying with it the latched holder and knife. As said knife is retained during withdrawal against lateral movement, or that along the path in which the work advances, there is no retrograde effect as to the feed. The feed-plate and channel-knife-support separate, and the former travels back to its initial position, the channel-knife-support having completed its return while making the cut. This terminates the operating cycle. As the thickness and density of the sole-stock vary, the resistance of the spring 34 may be altered by adjusting the screw 36, so a correct balance between the cutting and feeding effects of the rounding knife may be obtained.

Having described the invention, what is claimed as new and desired to secure by Letters Patent of the United States is:

1. In a cutting machine, cutting means, and means made effective by contact of the cutting means with the work for moving said cutting means to feed the work during the cutting operation.

2. In a cutting machine, cutting means, means for moving the cutting means to feed the work during the cutting operation, and an abutment opposing the cutting means and being movable therewith, the feeding action of the cutting means being dependent upon the resistance offered by the abutment to said cutting means.

3. In a cutting machine in which work is advanced for successive operations, yieldable cutting means, and means for moving the cutting means simultaneously toward the work and, as a consequence of its yield, in the direction of advance of said work.

4. In a cutting machine, reciprocatory cutting means, means for moving the cutting means to feed the work during the cutting operation, and means other than the moving means controlling the position of the cutting means for preventing reverse movement of the work during the retraction of said cutting means.

5. In a cutting machine in which work is advanced for successive operations, reciprocatory cutting means, means for moving the cutting means simultaneously toward the work and in the direction of its advance, and means for latching the cutting means against movement oppositely to the direction of work-advance during the withdrawal of said cutting means from the work.

6. In a rounding machine, a movable carrier, and a knife-holder movable upon the carrier under the influence of the work, independently of the carrier-movement, in a plane substantially parallel to that along which the carrier moves and in a direction inclined to the path of said carrier.

7. In a rounding machine, a movable carrier, a knife-holder movable upon the carrier in a direction inclined to the path of said carrier and longitudinally of said path, and a movable feed-plate co-operating with the knife.

8. In a rounding machine, a movable carrier, a knife-holder movable upon the carrier under the influence of the work, independently of the carrier-movement, in a plane substantially parallel to that along which the carrier moves and in a direction inclined to the path of said carrier, and means for urging the holder upon the carrier yieldably toward the work.

9. In a rounding machine, a movable carrier, a knife-holder movable upon the carrier in a direction inclined to the path of said carrier, means for urging the holder upon the carrier yieldably toward the work, and means for temporarily retaining the holder from movement upon the carrier toward the work.

10. In a rounding machine, a movable carrier, a knife-holder movable upon the carrier in a direction inclined to the path of said carrier, means for urging the holder upon the carrier yieldably toward the work, means for temporarily retaining the holder from movement upon the carrier toward the work, and means for rendering the retaining means ineffective.

11. In a rounding machine, a reciprocatory slide provided with ways inclined to the direction of reciprocation, means for applying the power of the machine to produce the opposite movements of the slide, and a rounding knife movable in the ways during the rounding operation.

12. In a rounding machine, a reciprocatory slide, means for successively reciprocating the slide as a work-piece is advanced past it, said slide being provided with ways inclined with respect to the direction of work-advance, a holder movable in the ways, a rounding knife fixed in the holder, and a feed-plate co-operating with said knife.

13. In a rounding machine, a reciprocatory slide provided with ways inclined to the direction of reciprocation, a holder movable in the ways, a spring interposed between the slide and holder, and a rounding knife fixed in the holder.

14. In a rounding machine, a reciprocatory slide provided with ways inclined to the direction of reciprocation, a holder movable in the ways, a spring interposed between the slide and holder, means arranged to vary the resistance of the spring to compression, and a rounding knife fixed in the holder.

15. In a rounding machine, a reciprocatory slide provided with ways inclined to the direction of reciprocation, a holder movable in the ways, a spring interposed between the slide and holder, a rounding knife fixed in the holder, and a latch arranged to retain the holder against the force of the spring.

16. In a rounding machine, a reciprocatory slide provided with ways inclined to the direction of reciprocation, a holder movable in the ways, a spring interposed between the slide and holder, a rounding knife fixed in the holder, a latch arranged to retain the holder against the force of the spring during withdrawal of the knife from the work, and means for releasing the latch upon continued retraction of the knife.

17. In a rounding machine, a reciprocatory slide provided with ways inclined to the direction of reciprocation, a holder movable in the ways, a spring interposed between the slide and holder, a rounding knife fixed in the holder, a latch pivoted upon the slide for engagement with the holder, and a contact member mounted in fixed relation to the slide for engagement with the latch.

18. In a rounding machine, a reciprocatory slide provided with ways inclined to the direction of reciprocation, a holder movable in the ways, a spring interposed between the slide and holder, a rounding knife fixed in the holder, a latch pivoted upon the slide for engagement with the holder, a contact member mounted in fixed relation to the slide for engagement with the latch, and means arranged to vary the time of engagement between the latch and the contact member.

19. In a rounding machine, a yieldable rounding knife, an abutment against which the knife cuts and is thereby caused to yield, and means for moving the knife and abutment to feed the work.

20. In a rounding machine, a yieldable rounding knife, a feed-plate against which the rounding knife cuts and is thereby caused to yield, and means for moving the knife and feed-plate into engagement with the work and for moving them when thus engaged to feed the work during the yield of the knife.

21. In a rounding and channeling machine, a channel-knife, a channel-knife-support, means for moving the channel-knife-support into engagement with the work and in a direction to advance said work, a rounding knife, and means for causing the cutting stroke of the rounding knife during the movement of the channel-knife-support in the direction of advance of the work.

22. In a rounding and channeling machine, a channel-knife, a channel-knife-support, means for moving the channel-knife-support into engagement with the work and in a direction to advance said work and reversely thereto for producing the cut of the channel-knife, a rounding knife, and means for causing the cutting stroke of the rounding knife during the movement of the channel-knife-support in the direction of advance of the work and for retaining said rounding knife in the work during the reverse travel of the channel-knife-support.

23. In a rounding and channeling machine, a rounding knife, a feed-plate against which the rounding knife cuts, a channel-knife, a channel-knife-support, and means for moving the channel-knife-support, the feed-plate and the rounding knife into engagement with the work and for moving them while thus engaged to feed the work.

24. In a rounding and channeling machine, a rounding knife, a feed-plate against which the rounding knife cuts, a channel-knife, a channel-knife-support, and means for moving the channel-knife-support, the feed-plate and the rounding knife into engagement with the work and for moving them while thus engaged to feed the work, the travel of the channel-knife being reversed to produce its cut during the cutting stroke of the rounding knife.

JAMES P. FREDERICKSEN.